United States Patent
Tabirian et al.

(10) Patent No.: US 10,330,947 B2
(45) Date of Patent: Jun. 25, 2019

(54) DIFFRACTIVE MIRRORS AND DIFFRACTIVE TELESCOPES WITH CORRECTED TEMPORAL DISPERSION

(71) Applicant: Beam Engineering for Advanced Measurements Co., Orlando, FL (US)

(72) Inventors: Nelson V. Tabirian, Winter Park, FL (US); David E. Roberts, Apopka, FL (US)

(73) Assignee: Beam Engineering for Advanced Measurements, Co., Orlando, FL (US)

( * ) Notice: Subject to any disclaimer, the term of this patent is extended or adjusted under 35 U.S.C. 154(b) by 0 days.

(21) Appl. No.: 15/189,551

(22) Filed: Jun. 22, 2016

(65) Prior Publication Data

US 2016/0370599 A1 Dec. 22, 2016

Related U.S. Application Data

(60) Provisional application No. 62/182,975, filed on Jun. 22, 2015.

(51) Int. Cl.
*G02B 27/42* (2006.01)
*G02B 23/06* (2006.01)
(Continued)

(52) U.S. Cl.
CPC ........ *G02B 27/4211* (2013.01); *G02B 5/1814* (2013.01); *G02B 5/1833* (2013.01);
(Continued)

(58) Field of Classification Search
CPC .... G02B 27/46; G02B 27/4211; G02B 27/42; G02B 5/18; G02B 5/30; G02B 5/1814;
(Continued)

(56) References Cited

U.S. PATENT DOCUMENTS 5,371,813 A * 12/1994 Artigue ............... G02B 6/124
359/570
6,219,185 B1 * 4/2001 Hyde ................ B64G 1/105
244/3.16
(Continued)

OTHER PUBLICATIONS

Beam Engineering for Advanced Measurements Co. et al., PCT Application No. PCT/US2016/038666 Search Report filed Jun. 22, 2016, Notification of Transmittal of the International Search Report and the Written Opinion of the International Searching Authority, or the Declaration, dated Oct. 10, 2016, 16 pages.
(Continued)

*Primary Examiner* — Jie Lei
(74) *Attorney, Agent, or Firm* — Brian S. Steinberger; Law Offices of Brian S. Steinberger, P.A.

(57) ABSTRACT

Mirrors, lenses, devices, apparatus, systems and methods for correcting temporal dispersion of laser pulses or other pulses of electromagnetic radiation in diffractive telescopes used in applications, such as but not limited to optical telescopes, transmitters, receivers, and transceivers for laser communication and imaging. Diffractive lenses and mirrors allow for producing large area telescopes and reducing or eliminating temporal dispersion of laser pulses and other pulses of electromagnetic radiation recorded by such telescopes. This can be achieved by utilizing high efficiency thin film diffractive optical films, particularly, diffractive waveplates, and having a secondary diffractive mirror of a shape selected to assure that the propagation time from the flat primary collecting lens or mirror is independent of the position on the flat primary collecting lens or mirror at which the radiation impinges.

8 Claims, 7 Drawing Sheets

(51) Int. Cl.
    *G02B 5/30*      (2006.01)
    *G02B 5/18*      (2006.01)
(52) U.S. Cl.
    CPC ......... *G02B 5/1876* (2013.01); *G02B 5/1895*
              (2013.01); *G02B 23/06* (2013.01); *G02B*
                                       *5/3083* (2013.01)
(58) Field of Classification Search
    CPC .. G02B 5/1833; G02B 5/3083; G02B 5/1876;
              G02B 23/00; G02B 23/06; G02B 23/18;
                         G02B 17/08; G02B 5/1895
    USPC ....... 359/364, 366, 247, 399, 410, 558, 563,
                                           359/565, 566
    See application file for complete search history.

(56) References Cited

U.S. PATENT DOCUMENTS

| | | | |
|---|---|---|---|
| 6,373,549 B1* | 4/2002 | Tombling | G02F 1/292 |
| | | | 349/119 |
| 7,095,772 B1 | 8/2006 | Delfyett et al. | |
| 7,450,213 B2 | 11/2008 | Kim et al. | |
| 10,197,715 B1 | 2/2019 | Tabirian et al. | |
| 10,274,650 | 4/2019 | Tabirian et al. | |
| 10,274,805 | 4/2019 | Tabirian et al. | |
| 2002/0097361 A1 | 7/2002 | Ham | |
| 2003/0218801 A1* | 11/2003 | Korniski | G01J 3/02 |
| | | | 359/407 |
| 2004/0105619 A1* | 6/2004 | Weaver | G02B 6/2931 |
| | | | 385/37 |
| 2005/0030457 A1 | 2/2005 | Kuan et al. | |
| 2006/0055883 A1 | 3/2006 | Morris et al. | |
| 2006/0221449 A1 | 10/2006 | Glebov et al. | |
| 2007/0040469 A1* | 2/2007 | Yacoubian | G01N 21/1702 |
| | | | 310/311 |
| 2007/0132930 A1 | 6/2007 | Ryu et al. | |
| 2009/0002588 A1 | 1/2009 | Lee et al. | |
| 2011/0085117 A1 | 4/2011 | Moon et al. | |
| 2011/0109874 A1 | 5/2011 | Piers et al. | |
| 2012/0162433 A1 | 6/2012 | Fuentes Gonzalez | |
| 2013/0057814 A1 | 3/2013 | Prushinskiy et al. | |
| 2015/0049487 A1 | 2/2015 | Connor | |
| 2016/0047955 A1 | 2/2016 | Tabirian | |
| 2016/0047956 A1 | 2/2016 | Tabirian | |

OTHER PUBLICATIONS

Beam Engineering for Advanced Measurements Co, et al., PCT Patent Application No. PCT/U2016/038666 filed Jun. 22, 2016, Notification Concerning Transmittal of International Preliminary Report on Patentability dated Jan. 4, 2018, 13 pages.

Andersen, G., et al., Broadband Antihole Photon Sieve Telescope, Applied Optics, Jun. 2007, pp. 3706-3708, vol. 46, No. 18.

Early, J., et al., Twenty Meter Space Telescope Based on Diffractive Fresnel Lens, SPIE, U.S. Department of Energy, Lawrence Livermore National Laboratory, Jun. 2003, 11 pages.

Pepper, M. et al, Nonlinear Optical Phase Conjugation, IEEE, Sep. 1991, pp. 21-34, 14 pages.

Tabirian, N., Utility U.S. Appl. No. 14/194,808, filed Mar. 2, 2014, Office Action Summary dated Feb. 9, 2018, 10 pages.

Tabirian, N., Utility U.S. Appl. No. 14/324,126, filed Jul. 4, 2014, Office Action Summary dated Feb. 8, 2018, 13 pages.

\* cited by examiner

DIFFRACTIVE MIRRORS AND DIFFRACTIVE TELESCOPES WITH CORRECTED TEMPORAL DISPERSION

CROSS REFERENCE TO RELATED APPLICATIONS

This application claims the benefit of priority to U.S. Provisional Patent Application Ser. No. 62/182,975 filed Jun. 22, 2015. The entire disclosure the application listed in this paragraph is incorporated herein by specific reference thereto.

GOVERNMENT LICENSE RIGHTS

This invention was made with Government support under contract NNX14CP60P awarded by NASA. The government has certain rights in the invention.

FIELD OF INVENTION

This invention relates to diffractive mirrors and in particular to mirrors, lenses, devices, apparatus, systems and methods for correcting temporal dispersion of pulses of electromagnetic radiation, for example laser pulses, in diffractive telescopes used in applications such as but not limited to optical receivers for laser communication and imaging, and radio frequency telescopes for communication.

BACKGROUND AND PRIOR ART

The development of diffractive elements including diffractive lenses and mirrors allows the construction of a variety of large area optical devices, including telescopes, without the need for thick and heavy conventional optical components such as conventional glass lenses and mirrors. It is possible to construct telescopes for imaging or for collecting laser radiation using only a flat diffractive lens or mirror.

However, if the laser radiation to be collected is in the form of short pulses, such as would be the case for some laser communication systems or for systems designed for imaging, the use of diffractive components could result in stretching of the received laser pulse as a result of temporal dispersion of light received by the telescope. This result is undesirable in laser communication systems because it can interfere with the ability of the communication receiver to detect the pulse and to determine the location of the pulses, resulting in reduction of communication bandwidth and/or reduction of communication range.

Furthermore, in imaging using short-pulse laser illumination of the scene, stretching of the received pulses can degrade the accuracy of range measurements and/or reduce the range at which imaging can be performed with a given laser power.

Prior art methods exist for compensating chromatic aberrations in telescopes in which the primary optical element is diffractive. Examples of this prior art are provided in Andersen, G. et al., "Broadband antihole photon sieve telescope," Applied Optics, Jun. 27, 2007, pp. 3706-3708, vol. 46 No. 18. In this work by Andersen et al., the primary optical element of the telescope was an anti-hole photon sieve, but the chromatic dispersion effects apply to any telescope with a diffractive primary element. Other prior art includes Early, J. et al.; "Twenty meter space telescopes based on diffractive Fresnel lens," Proceedings of SPIE vol 5166, pp 148-156 (2004).

In this latter work, the primary collection optic was a 20-meter diameter Fresnel lens. In both the work of Andersen et al. and Early et al., correction for chromatic dispersion in the primary collection optic was provided by diffractive corrector elements, referred to in the paper by Andersen et al. as the "diffractive optical element," and in the paper by Early et al. as the "Fresnel corrector." Because the design concepts described in these two referenced prior art publications were intended to provide imaging over a relatively broad spectral band, the noted diffractive corrector elements provided correction over an optical bandwidth much broader than is required for optical communications. However, these prior art chromatic dispersion correction methods require multiple optical elements, in addition to the diffractive corrector elements. These additional optical elements add size, weight, and cost to the telescope system.

Antennas operating in the radio frequency and microwave bands, including bands in which the wavelength is between 1 mm and 10 cm, often are have a spherical or parabolic shape. The expense and weight of such systems could be reduced if the primary collecting element could be flat instead of curved, without introducing pulse stretching or other distortion in the received signals.

Hence, there is a need for a telescope system that includes a flat diffractive lens or mirror as the primary optic, and includes the means for eliminating temporal dispersion of received laser pulses or other received optical radiation or other electromagnetic radiation with a single optical corrector element.

SUMMARY OF THE INVENTION

A primary objective of the present invention is to provide mirrors, lenses, devices, apparatus, systems and methods for correcting temporal dispersion of laser pulses or pulses of other electromagnetic radiation in diffractive telescopes used in applications, such as but not limited to optical transmitters, receivers, and transceivers for laser communication, and for imaging.

An embodiment of a telescope system can include a flat primary diffractive lens, and a temporal dispersion corrector optical mirror or other reflector, having a curvature and diffraction grating structure such that all rays of light or other electromagnetic radiation at a specified operating wavelength, and normally incident on the primary diffractive element, traverse the same path length from the flat primary diffractive lens to the focal point of the telescope system or receiver system.

The primary diffractive element can be a diffractive waveplate lens. The primary diffractive element can be a diffractive Fresnel lens.

The temporal dispersion corrector mirror can be a diffractive waveplate mirror.

The diffractive waveplate mirror can consist of a two-layer structure that includes a patterned half-wave retardation layer and a non-patterned quarter-wave retardation layer.

The diffractive waveplate mirror can consist of a single-layer patterned quarter-wave retardation layer.

The temporal dispersion corrector mirror can be a diffractive Fresnel mirror.

Another embodiment of a telescope system can include a flat primary diffractive mirror, and a temporal dispersion corrector mirror, having a curvature and diffraction grating structure such that all rays of light or other electromagnetic radiation at a specified operating wavelength, and normally incident on the primary diffractive element, traverse the same path length from the flat primary diffractive lens to the focal point of the telescope.

The primary diffractive element can be a diffractive waveplate mirror.

The primary diffractive element can be a diffractive Fresnel mirror.

The temporal dispersion corrector mirror can be a diffractive waveplate mirror.

The diffractive waveplate mirror consists of a two-layer structure that includes a patterned half-wave retardation layer and a non-patterned quarter-wave retardation layer.

The diffractive waveplate mirror consists of a single-layer patterned quarter-wave retardation layer.

The temporal dispersion corrector mirror is a diffractive Fresnel mirror.

Another telescope system can include a primary diffractive element, and a diffractive mirror for correcting temporal dispersion that includes a reflective surface, and a phase retardation layer conforming to said reflective surface, and a diffractive waveplate layer conforming to said reflective surface, wherein the optical axis modulation pattern in the diffractive waveplate layer is correlated with the shape of the surface to correct for temporal dispersion when focusing a light beam or a beam of other electromagnetic radiation.

The primary diffractive element can include at least one diffractive waveplate lens.

The primary diffractive element can be a diffractive Fresnel lens.

The primary diffractive element can be a diffractive mirror comprising a reflective surface, a phase retardation layer conforming to reflective surface, and a diffractive waveplate layer conforming to said reflective surface The diffractive waveplate can be a quarter-wave plate.

Further objects and advantages of this invention will be apparent from the following detailed description of the presently preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

The present invention relates to an apparatus for reducing or eliminating the temporal dispersion that causes pulse stretching in telescopes used for collecting laser pulses and focusing the energy of such pulses into a laser receiver.

Figure 1:
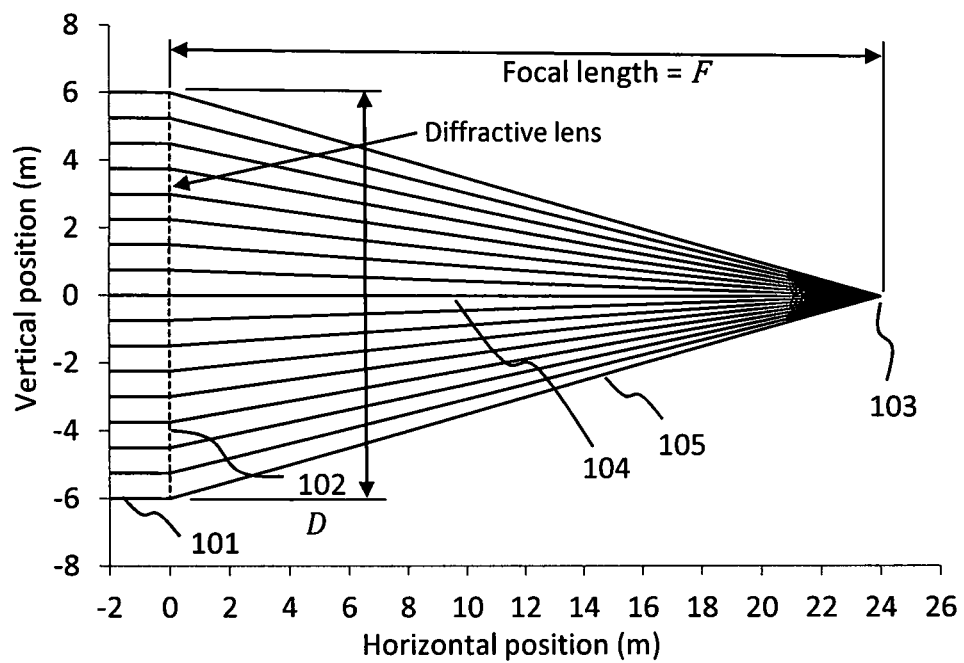
FIG. 1 shows a schematic side view of a telescope employing a single flat diffractive lens to collect laser pulses and focus the laser energy to a focal point.

As shown in FIG. 1, an input optical beam 101 can be focused by a circular flat diffractive lens 102 to a focal point 103. The diffractive lens could be a diffractive waveplate lens, a diffractive Fresnel lens, or any other flat diffractive element that has the indicated focusing properties.

Because the optical path length from the edge of lens in FIG. 1 to the focal point 103 is greater than the optical path length from the center of the lens to the focal point 103, energy from a short laser pulse incident simultaneously over the entire area of diffractive lens 102 will be spread out in time, or temporally dispersed, when it reaches the focal point 103. Laser light along a central ray 104 will reach the focal point 103 before laser light along an edge ray 105 reaches the focal point 103.

For the geometry illustrated in FIG. 1 as an example, the distance from the center of the lens to the focal point is approximately 24.00 meters, and the distance from the edge of the lens to the focal point is approximately 24.74 meters. Because the speed of light is approximately $3 \times 10^8$ m/s, a short pulse incident on the front face of the telescope will be spread out over a period of time approximately equal to $(24.74 \text{ m} - 24.00 \text{ m})/(3 \times 10^8 \text{ m/s})$=approximately 2.5 ns when it reaches the focal point 103.

For long laser pulses, a temporal dispersion or pulse stretching of approximately 2.5 ns would be insignificant, but for pulsewidths common in modern optical communication systems, such temporal dispersion would significantly degrade the performance of the communication system. For example, if the laser pulses used in a laser communication system have a pulsewidth of approximately 0.5 ns at the input to this telescope, stretching of the pulse by an additional approximately 2.5 ns would be a severe detriment to the usefulness of a telescope intended to collect such pulses. This is illustrated in FIG. 2, which shows the pulse amplitude (or equivalently, optical power) versus time for an input pulse 201 with a duration of approximately 0.5 ns.

Figure 2:
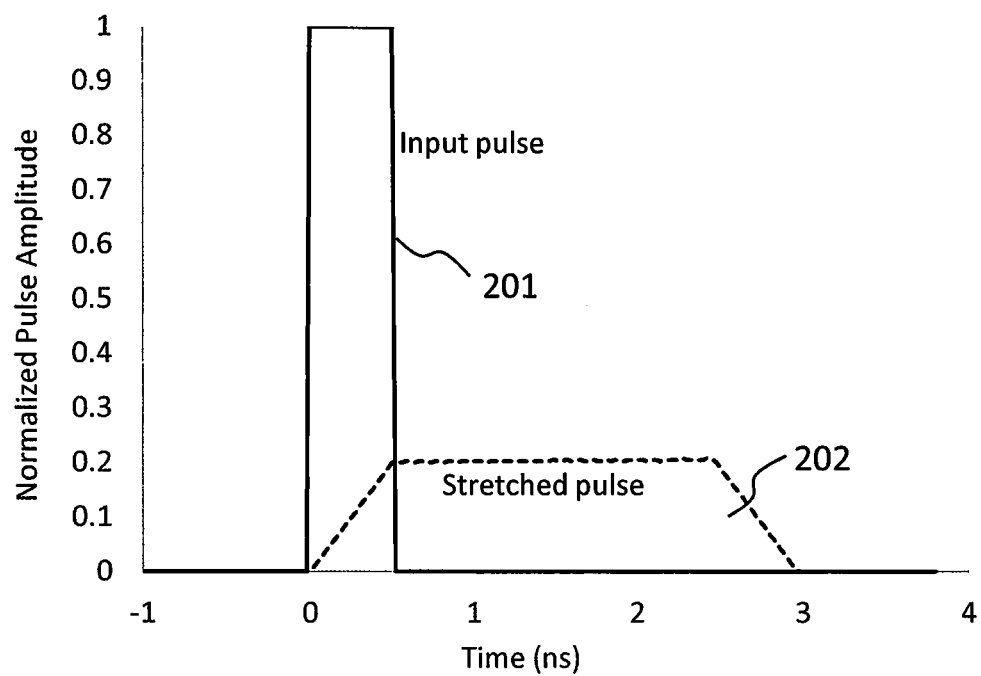
FIG. 2 illustrates the stretching of a laser pulse in time by a telescope such as the one illustrated in FIG. 1.

If such a laser optical pulse, with a lateral spatial extent exceeding the diameter of the diffractive primary lens 102 shown in FIG. 1, is transmitted to the focal point 103 in FIG. 1, the dependence of the pulse amplitude at this focal point on time after stretching by the telescope is shown at 202 in FIG. 2. Such stretching would severely degrade the usefulness of the telescope for any optical communication system, imaging system, or other laser system employing short pulses.

Figure 3A:
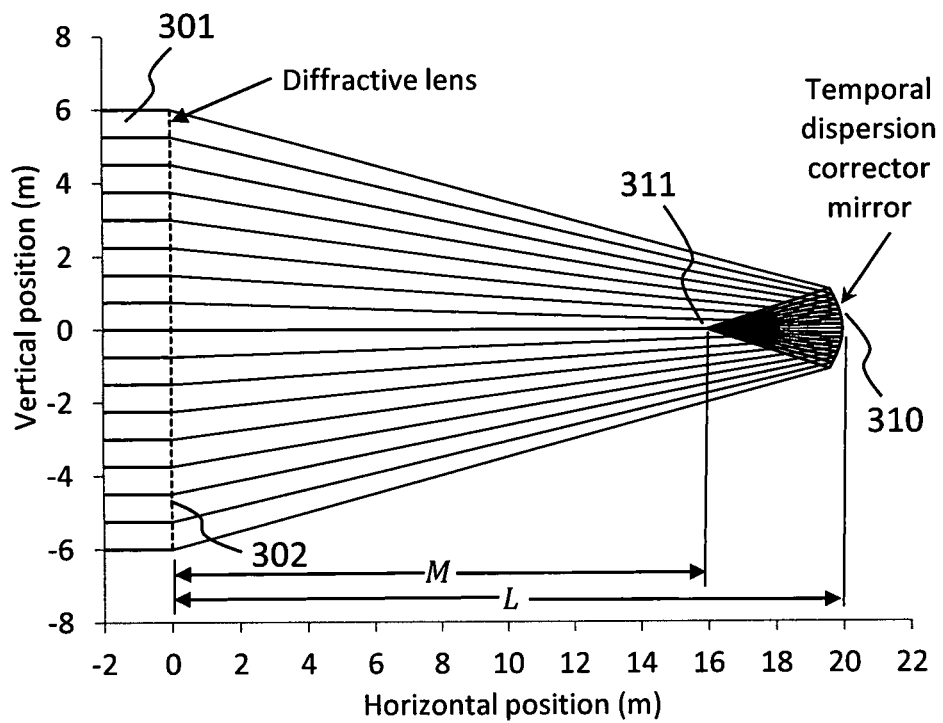
FIGS. 3A, 3B, and 3C illustrate the structure of a telescope employing a primary lens consisting of a flat circular diffractive lens, and a secondary element consisting of a curved mirror with a diffractive coating, designed such that said apparatus corrects for temporal dispersion of the input laser pulse caused by the diffractive primary optical lens.
Figure 3B:
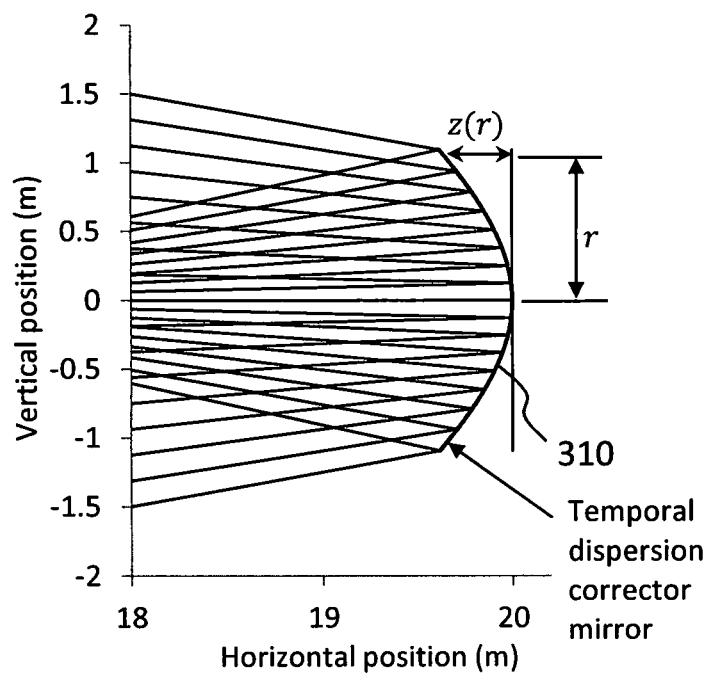
Figure 3C:
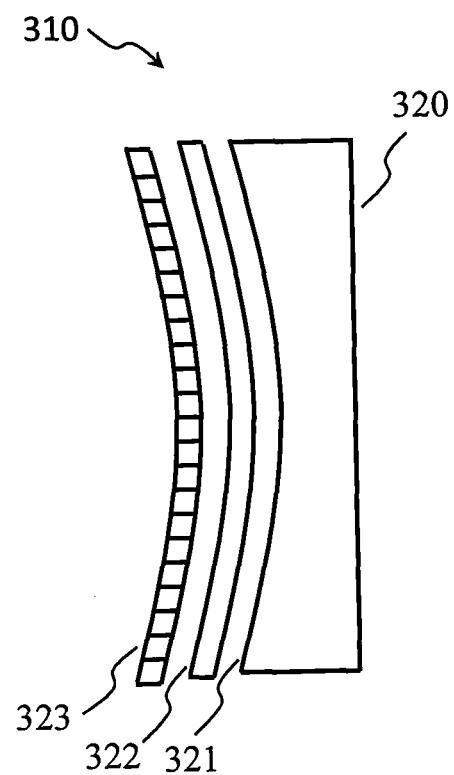

A preferred embodiment of the invention disclosed here is illustrated in FIGS. 3A, 3B and 3C. For this illustration in FIG. 3A, the circular flat diffractive lens 302, shown schematically in a side view in FIG. 3A, is exactly the same as the diffractive lens 102 in FIG. 1, with a focal length F=approximately 24 m as an example. In FIG. 3A, an optical beam 301 is incident across the entire face of lens 302. An apparatus 310, referred to hereinafter as a temporal dispersion corrector mirror, is inserted into the converging beam from lens 302, at a distance L from lens 302. The temporal dispersion corrector mirror 310 is such that the beam is focused to a focal point 311, which is at a distance M from lens 302. The shape and surface coating of temporal dispersion corrector mirror 310 is such as to eliminate the pulse stretching, such that the temporal shape of the pulse received in the focal plane 311 in FIG. 3A is the same as the temporal shape of the pulse incident on the diffractive lens 302.

The detailed structure of the temporal dispersion corrector of the present invention in a preferred embodiment is shown in FIG. 3B and, in exploded view, in FIG. 3C. The optically active surface (i.e. the surface facing the input optical beam) is a surface of revolution, with an axial offset of $z(r)$ at a radius r from the optical axis.

The function $z(r)$ of FIG. 3B is uniquely determined by the requirement that the optical paths for every ray from the diffractive lens 302 in FIG. 3A to the focal point 311 be exactly the same. This can be obtained as follows. Consider any input optical ray, propagating left to right in FIG. 3A, incident on the diffractive lens 302 at a radius R from the optical axis. It can be shown that after diffraction by the lens of focal length F, the ray will intersect the surface $z(r)$ at a radius r given by the following formula:

$$r = \frac{R[F - L + z(r)]}{F} \quad (1)$$

In Equation (1), F is the focal length of the diffractive lens 302 in FIG. 3A, and L is the distance from the diffractive lens to the vertex of the temporal dispersion corrector mirror 310, as shown in FIG. 3A. The condition that the total optical path length from the diffractive lens 302 to the focal point 311 be the same for the ray incident on the lens 302 at radius R as for the on-axis ray can be shown to be the following formula:

$$\{r^2 + [L-M-z(r)]^2\}^{1/2} + \{(R-r)^2 + [L-z(r)]^2\}^{1/2} = 2L - M \quad (2)$$

Together, Equations (1) and (2) implicitly define the function $z(r)$ that is required to make the path lengths equal for all rays in FIG. 3A, from the diffractive lens 302 to the focal point 311.

The following equations provide further clarification of the specific spatial form of the temporal dispersion corrector mirror 310 in FIG. 3:

$$z(r) = \frac{b}{a} \quad (3)$$

where $$a = 2[(F-L)\sin\theta^2(2L-M)\cos\theta - L + (L-M)(\cos\theta)^2] \quad (4)$$

$$b = (L-M)^2(\cos\theta)^2 + (F-L)^2(\sin\theta)^2 - [(2L-M)\cos\theta - L]^2 \quad (5)$$

$$\theta = \tan^{-1}(R/F) \quad (6)$$

Equations (3)-(6) allow a value of $z(r)$ to be computed for each input ray height R. For each such $z(r)$ the corresponding value of r can be calculated from Equation (1).

As an illustration of the use of Equations (1)-(6) to implicitly define the form of the function $z(r)$, and therefore the structure of the temporal dispersion corrector mirror 310 illustrated in FIG. 3, a specific example will be given, using the telescope design concept illustrated in FIG. 3. It will be shown that the path length from the lens 302 to the focal point 311 in FIG. 3A is the same for the edge ray as for the on-axis ray, provided the function $z(r)$ defining the optical surface of the temporal dispersion corrector mirror (310 in FIG. 3) satisfies Equations (1) and (2).

The values of r and $z(r)$ that satisfy formulas (1) and (2) for the edge ray (for which R=approximately 6 m) and for the values M=approximately 16 m and L=approximately 20 m (where M and L are the dimensions shown in FIG. 3A) are r=approximately 1.096 m and $z(r)$=approximately 0.383 m. As can easily be verified, for these values both the left and right sides of formula (1) have the value approximately 1.096 m, and both the left and right sides for formula (2) have the value approximately 24 m.

The total path length of the axial ray from the input lens 302 to the focal point 311 in FIG. 3A is approximately 24 m. The total path length of the edge ray from the input lens 302 to the focal point 311 is the path length from the lens to the temporal dispersion corrector 310 plus the path length from the temporal dispersion corrector mirror 310 to the focal point 311.

The path length of the edge ray from the lens 302 to the temporal dispersion corrector mirror 310 is equal to $\sqrt{[L-z(r)]^2 + (R-r)^2} = \sqrt{(20-0.383)^2 + (6-1.096)^2}$=approximately 20.221 m, and the path length of the edge ray from the temporal dispersion corrector mirror 310 to the focal point 311 is equal to $\sqrt{[L-M-z(r)]^2 + r^2} = \sqrt{(20-16-0.383)^2 + 1.096^2}$=approximately 3.779 m. Therefore the total optical path length for the edge ray from the lens 302 to the focal point 311 in FIG. 3A is 20.221+3.779=approximately 24.000 m, exactly the same path length as for the on-axis ray.

Figure 4:
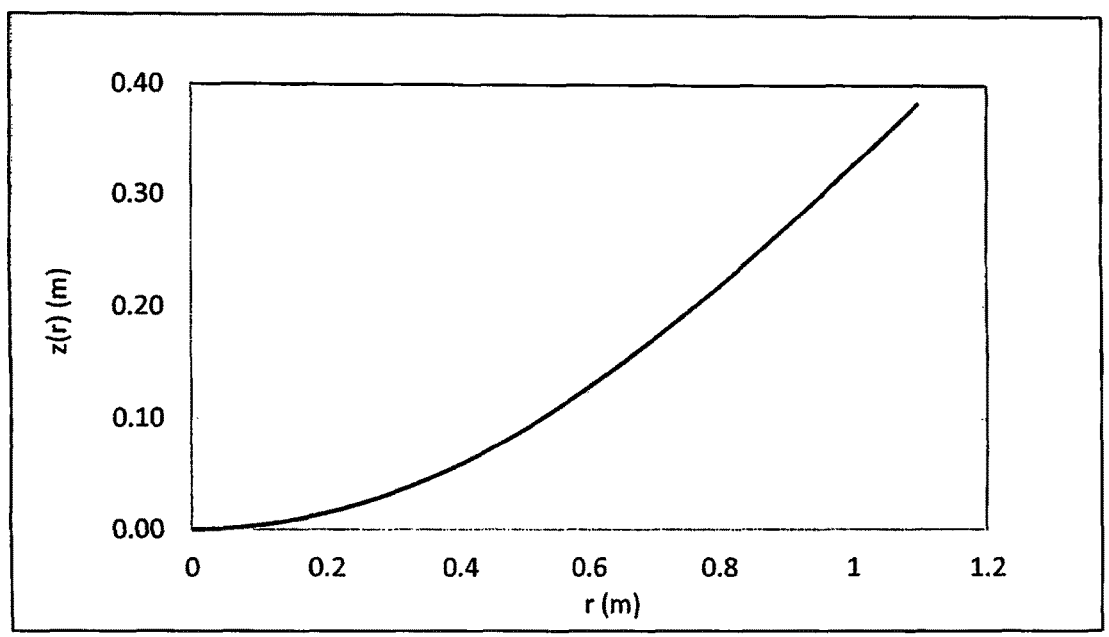
FIG. 4 shows an exemplary surface profile of a temporal dispersion corrector mirror.

The example given above demonstrates that for the particular case for which a ray trace is shown in FIG. 3, satisfaction of formulas (1) and (2) by the function $z(r)$ is consistent with the optical path length for all rays from the lens 302 to the focal point 311 in FIG. 3A being equal. This is also the condition for zero temporal dispersion of laser pulses propagating from the lens to the focal point. Therefore, a temporal dispersion corrector mirror whose surface is defined by the function $z(r)$ eliminates the temporal dispersion that would be present for pulses reaching the focal plane 103 in FIG. 1. The function $z(r)$ for the noted example, determined from Equations. (1) through (6), is shown in FIG. 4.

One other key characteristic of the temporal dispersion corrector mirror 310 in FIG. 3 is that it does not change the magnitude of the ray angles with respect to the optical axis of the telescope, only the sign of these angles. This is achieved by means of a diffractive reflective coating that is part of the temporal dispersion corrector mirror 310 in FIG. 3A and FIG. 3B. In a preferred embodiment, this diffractive reflective coating is a diffractive waveplate mirror coating as illustrated in FIG. 3C. This diffractive waveplate mirror coating consists of a non-depolarizing reflective coating 321 on a substrate 320, a non-patterned quarter-wave phase retarder film 322, and a patterned half-wave diffractive waveplate coating 323 on the optical surface of the temporal dispersion corrector mirror 310 in FIG. 3C.

Figure 5:
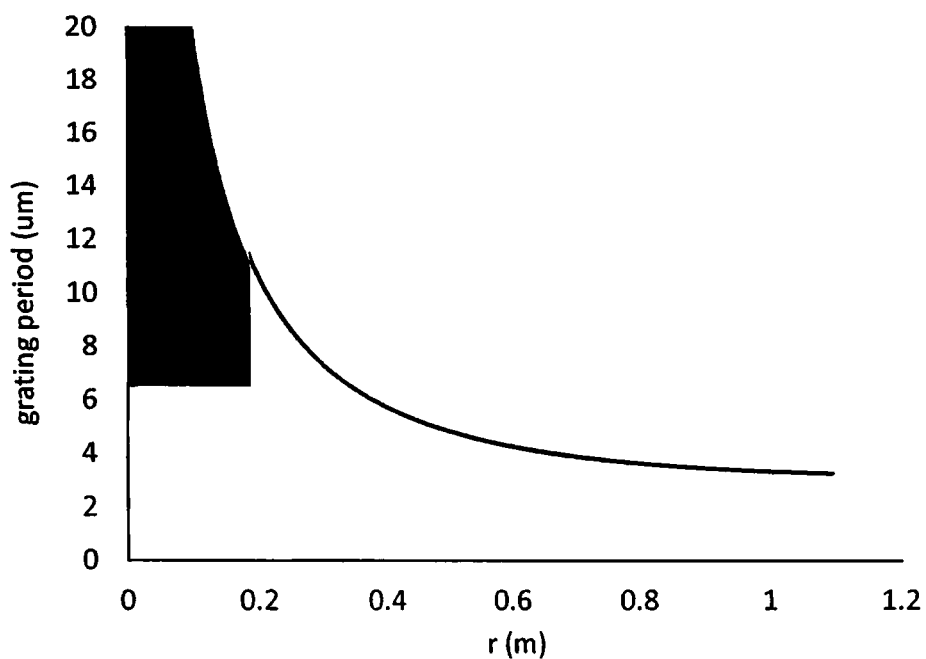
FIG. 5 shows an exemplary distribution of the grating period on the surface of a temporal dispersion corrector mirror show in FIG. 4.

The diffractive waveplate grating period Λ on the temporal dispersion corrector mirror that accomplishes this is given by the following formula:

$$\Lambda = \frac{2\lambda}{\sin \alpha - \sin \beta} \qquad (7)$$

where the parameters α and β are defined as:

$$\alpha = \theta + \tan^{-1} \frac{dz(r)}{dr} \qquad (8)$$

$$\beta = \tan^{-1} \frac{r}{L - M - z(r)} - \tan^{-1} \frac{dz(r)}{dr} \qquad (9)$$

and λ is the operating wavelength in vacuum. For the example discussed previously, and for an operating wavelength of λ=approximately 1550 nm, the grating period as a function of the coordinate r is shown in FIG. 5.

Although a specific preferred embodiment is used for illustrative purposes in this disclosure, as illustrated in FIG. 3, many variations will be evident to those skilled in the art. These variations include, but are not limited to the following:

Application to diffractive telescopes in which the primary collecting element is a diffractive mirror instead of a diffractive lens Applications in which the magnitude, as well as the sign, of the ray angles are changed by the temporal dispersion corrector mirror Applications in which the diffractive reflective coating on the temporal dispersion corrector mirror 310 in FIGS. 3A and 3B is a diffractive Fresnel mirror Applications in which the diffractive coating on the temporal dispersion corrector mirror is a patterned quarter-wave plate, instead of a combination of a patterned half-wave layer over a non-patterned quarter-wave layer as illustrated in FIG. 3C.

The term "approximately" is similar to the term "about" and can be +/−10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A telescope system comprising:
    a flat thin film primary diffractive waveplate lens providing near 100% high efficiency; and
    a temporal dispersion corrector mirror, having a curvature and diffraction grating structure that is a coating of a continuous surface such that all rays of light or other electromagnetic radiation at a specified operating wavelength, and normally incident on the flat primary diffractive lens, traverse the same path length from the flat primary diffractive lens to the focal point of the telescope, wherein the mirror is configured to eliminate a temporal dispersion that would be present for pulses reaching the focal point of the telescope.

2. The telescope system as in claim 1, wherein the temporal dispersion corrector mirror is a diffractive waveplate mirror.

3. A telescope system comprising:
    a flat thin film primary diffractive lens; and
    a temporal dispersion corrector mirror, having a curvature and diffraction grating structure that is a coating of a continuous surface such that all rays of light or other electromagnetic radiation at a specified operating wavelength, and normally incident on the flat primary diffractive lens, traverse the same path length from the flat primary diffractive lens to the focal point of the telescope, wherein the temporal dispersion corrector mirror is a diffractive waveplate mirror comprising:
    a substrate containing a non-depolarizing reflective coating, the substrate having a surface shape defined such as it eliminates a temporal dispersion that would be present for pulses reaching a focal point of the telescope;
    a non-patterned quarter-wave phase retarder film; and
    a patterned half-wave diffractive waveplate coating.

4. The telescope system as in claim 3, wherein the diffractive waveplate mirror comprises a patterned quarter-wave plate.

5. A telescope system comprising:
    a flat primary diffractive waveplate mirror providing near 100% high efficiency; and
    a temporal dispersion corrector mirror, having a curvature and diffraction grating structure that is a coating of a continuous surface such that all rays of light or rays of other electromagnetic radiation at a specified operating wavelength, and normally incident on the primary diffractive element, traverse the same path length from the flat primary diffractive lens to a focal point of the telescope, wherein the mirror is configured to eliminate a temporal dispersion that would be present for pulses reaching the focal point of the telescope.

6. The telescope system as in claim 5, wherein the temporal dispersion corrector mirror is a diffractive waveplate mirror.

7. The telescope system as in claim 6, wherein the diffractive waveplate mirror comprises:
    a substrate containing a non-depolarizing reflective coating;
    a patterned half-wave retardation layer; and
    a non-patterned quarter-wave retardation layer.

8. The telescope system as in claim 6, wherein the diffractive waveplate mirror comprises a single-layer patterned quarter-wave retardation layer.

* * * * *